A. D. BROWN.
Straw Cutter.
No. 25,700.
Patented Oct. 4, 1859.
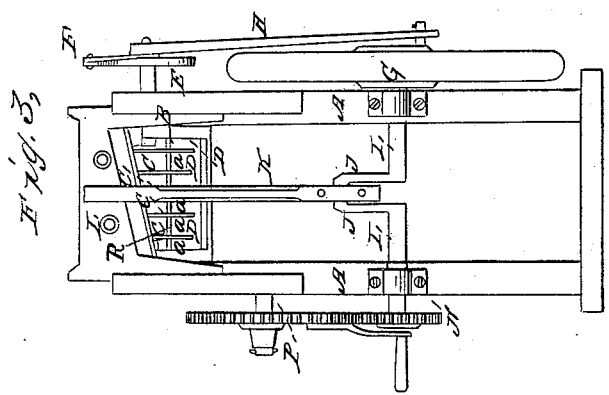
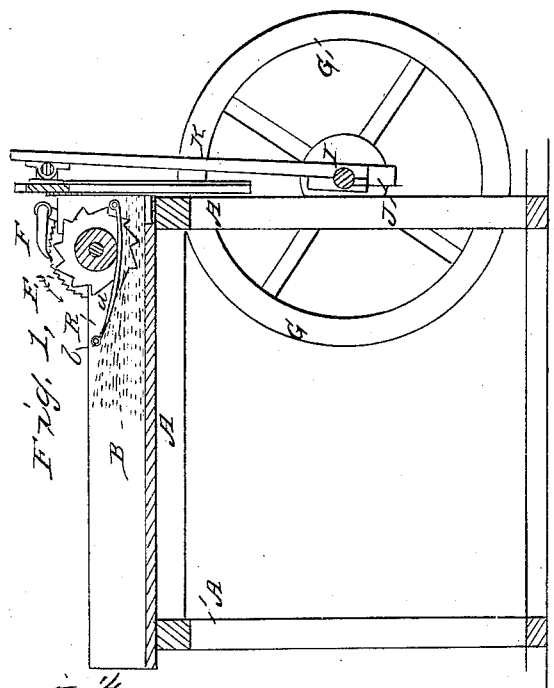
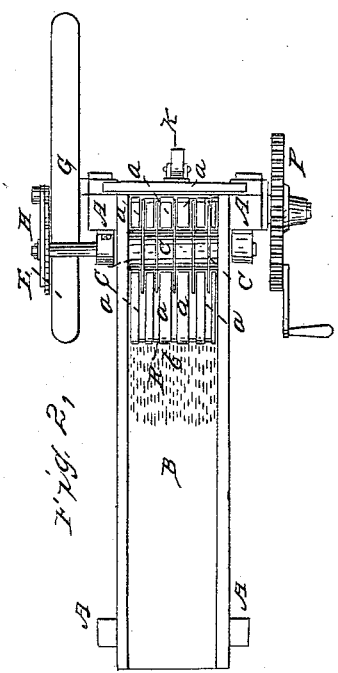

UNITED STATES PATENT OFFICE.

A. D. BROWN, OF COLUMBUS, GEORGIA, ASSIGNOR TO SALLIE C. BROWN, OF SAME PLACE.

STRAW-CUTTER.

Specification of Letters Patent No. 25,700, dated October 4, 1859.

*To all whom it may concern:*

Be it known that I, A. D. BROWN, of Columbus, in the county of Muscogee and State of Georgia, have invented a new and useful Improvement in Straw-Cutters; and I do hereby declare that the following is a full, clear, and exact description thereof, reference being had to the accompanying drawings and to the letters of reference marked thereon, of which—

Figure 1, represents a vertical central section taken through the machine showing clearly the metal guard. Fig. 2, is a plan view of the same. Fig. 3, is an end elevation of the same.

A, represents the frame of the machine supporting the straw box B.

C, is a shaft or drum provided with a suitable number of feed wheels D, which are similar to circular saws, and acting to feed the straw to the knife like those in common use. These feed wheels are rotated by a ratchet wheel E, and pawl F, in the direction indicated by the arrow of Fig. 1, so as to impel the straw forward at each revolution of the fly wheel G, to which the pawl is attached by a connecting rod H. The fly wheel is fixed to the end of a shaft I, and communicates motion to the cutter from crank J, by a connecting rod K. The knife being fixed to a sash L, and made adjustable thereon, works up and down in slides similar in many respects to those in use.

The machine is operated by a pinion spur wheel N, and large spur wheel P, to which latter a crank is attached.

This description gives a general outline of the several parts of the straw cutter to which the guard R, is attached which constitutes my invention, and is arranged and operates as follows: The feed wheels are made of thin metal with teeth similar to those of a saw, these are arranged at suitable distances apart and operated as above described, and are placed in front of the straw box just behind the cutter. The straw is placed in the trough or box in the usual manner and pressed toward the feed wheels and under the guard R, which is made up of strips $a$, $a$, of metal, as represented by Fig. 2, the width of the metal strips apart, allowing the wheels to turn freely between them. These strips which form the guard are fixed to a rod $b$, placed in rear of the feed wheels and at or near the top of the straw box and pass down under the drum of the wheels and are fixed to another rod $c$, which is on a line with the lower portion of the drum of the wheels; the straw is thus acted upon by the feeders with the same efficiency at the same time the straw is gradually compressed until it reaches the knife and prevented from rising from the bed of the straw box after passing under the feeders.

The guard can be attached to any machine having circular feeders, with a very trifling expense, increasing its efficiency and rendering the machine more valuable.

What I claim as my invention and desire to secure by Letters Patent, is—

The arrangement and combination of the yielding strips ($a$) constituting guard R, with the wheels D, sash L, and trough B, as and for the purpose herein shown and described.

A. D. BROWN.

Witnesses:
 JOB B. HICKS,
 R. M. ALDWORTH.